United States Patent [19]
Hassner et al.

[11] Patent Number: 5,638,065
[45] Date of Patent: Jun. 10, 1997

[54] MAXIMUM-LIKELIHOOD SYMBOL DETECTION FOR RLL-CODED DATA

[75] Inventors: Martin A. Hassner, Palo Alto, Calif.; Tetsuya Tamura, Yamato, Japan; Shmuel Winograd, Scarsdale, N.Y.

[73] Assignee: International Business Machines Corporation, Armonk, N.Y.

[21] Appl. No.: 489,863

[22] Filed: Jun. 13, 1995

[51] Int. Cl.$^6$ ..................................................... H03M 7/00
[52] U.S. Cl. ............................ 341/59; 375/343; 371/43
[58] Field of Search ............................... 341/58, 59, 94; 360/40, 48; 371/43; 375/232, 233, 236, 341, 342, 343, 348

[56] References Cited

U.S. PATENT DOCUMENTS

| | | | |
|---|---|---|---|
| 4,403,331 | 9/1983 | Halpern et al. | 375/267 |
| 4,646,173 | 2/1987 | Kammeyer et al. | 360/51 |
| 4,888,779 | 12/1989 | Karabed et al. | 371/43 |
| 4,945,538 | 7/1990 | Patel | 371/43 |
| 5,138,314 | 8/1992 | Shimpuku | 341/58 |
| 5,341,249 | 8/1994 | Abbott et al. | 360/46 |
| 5,345,342 | 9/1994 | Abbott et al. | 360/48 |
| 5,381,359 | 1/1995 | Abbott et al. | 360/40 |
| 5,422,760 | 6/1995 | Abbott et al. | 360/46 |
| 5,491,698 | 2/1996 | Patel et al. | 341/59 |

FOREIGN PATENT DOCUMENTS

0463752A2  1/1992  European Pat. Off. .......... G06F 7/04

OTHER PUBLICATIONS

Alan H. Morton et al., "PRML Technology Delivers More Bytes for the Buck", Data Storage, May/Jun. 1995, pp. 45–48.

J. L. Walsh, "A Closed Set of Normal Orthogonal Functions", American Journal of Mathematics, vol. 45, 1923, pp. 5–24.

*Primary Examiner*—Howard L. Williams
*Attorney, Agent, or Firm*—James C. Pintner; Henry E. Otto, Jr.

[57] ABSTRACT

Parallel ML processing of an analog signal in a RLL-coded channel in which (1) vectors for a current state of the channel and the next state of the channel are computed using Walsh transform vector coefficients of the analog signal; (2) current state vectors and next state vectors and values of vectors precomputed in analog matched filters are used to generate vector scalar products which are compared against preselected threshold values for generating binary decision outputs that are used in digital sequential finite state machines to generate ML symbol decisions; and (3) ML symbol decisions are fed back and used to subtract the intersymbol interference value of the current state vector from the vector of the next state to transform the next state vector into an updated current state vector.

20 Claims, 17 Drawing Sheets

PRIOR ART

FIG. 2A

SIGNAL 1

| 0 | 0 | 0 | 1 | 3 | 3 | 1 | 0 |
| W1 | W2 | W3 | W4 | W5 | W6 | W7 | W8 |

FIG. 2B

SIGNAL 2

| 0 | 0 | 0 | 0 | 1 | 3 | 3 | 1 |
| W1 | W2 | W3 | W4 | W5 | W6 | W7 | W8 |

FIG. 2C

| 0 | 0 | 0 | 1 | 2 | 0 | -2 | -1 |

VECTOR DIFFERENCE VALUE

MAXIMUM-LIKELIHOOD SYMBOL DETECTION FOR RLL-CODED DATA

TECHNICAL FIELD

This invention relates to an apparatus and method for processing analog signals in a magnetic disk drive channel, and more particularly to an Apparatus and method for detecting multiple-bit symbols by (i) converting the analog signals into analog vectors using a linear Walsh transform, and (ii) making maximum-likelihood decisions using vector metric calculations which are determined by the selected run-length-limited modulation code and equalized linear channel response signal shape and are implemented by analog matched filters, analog comparators, and digital sequential finite-state machines matched to RLL-coded symbols.

BACKGROUND OF THE INVENTION

In a read channel, a read head (inductive or magnetoresistive) generates an analog signal from data stored in binary form on a disk. Each transition in the orientation of the recorded binary data results in a peak in the analog signal. In a channel using peak detection, the electronic components of the read channel must reliably detect the peaks in the analog signal in order to reconstruct the binary data. A peak is detected (1) if the signal changes its sign, (2) if it exceeds a threshold, and (3) if its derivative is zero.

Published European Patent Application 0 463 752 A2 discloses a pattern-matching circuit which compares bit by bit a given multibit binary data pattern against templates of various multibit patterns and then outputs as the most likely multibit pattern that one which most closely matches the given pattern. However, it does not teach matching of a binary pattern to an analog signal.

U.S. Pat. No. 4,945,538 discloses a signal processing channel which processes an analog read signal after it is converted by an analog-to-digital converter into digitized sample values. Appropriate values of functional expressions of the digitized sample values are precomputed for a preselected number of sample values ahead of a then current sample value for bit-by-bit maximum-likelihood (ML) detection. However, it does not disclose or suggest analog multibit ML detection, feedback of the ML decision for the purpose of intersymbol interference subtraction, or clock offset correction.

Commonly assigned U.S. Ser. No. 08/327,062, filed Oct. 21, 1994, discloses a signal processing channel in which a run-length-limited (RLL)-coded analog read signal is integrated and weighted by a preselected set of staircase amplifier gain factors to provide a plurality of staggered analog signals, each of which is constant for an identical preselected period of time (such as a half-bit period) but offset timewise in equal increments for detecting multibit patterns instead of single bits. However, it does not provide ML detection and/or feedback and it requires a half-bit clock. J. Walsh, "A Closed Set of Normal Orthogonal Functions", *American Journal of Mathematics*, Vol. 45, pp. 5–24 (1923), explains what are hereinafter referred to as the "Walsh functions" and "Walsh transform coefficients".

A. H. Morton et al., "PRML Technology Delivers More Bytes for the Buck", *Data Storage*, May/June 1995, pp. 45–48, discuss PRML technology and (at page 48) describe the advantages of an EEPR4 RLL (1,7)-coded channel for writing and the need for a high-speed clock with such a channel when reading. This problem when reading is alleviated by applicants' invention embodying a multibit ML symbol detector.

No prior art known to applicants discloses parallel ML processing of an analog signal in a RLL-coded channel in which (1) vectors for a current state of the channel and the next state of the channel are computed using Walsh transform vector coefficients of the analog signal; (2) current state vectors and next state vectors and values of constant vectors precomputed in analog matched filters are used to generate vector scalar products which are compared against preselected threshold values for generating binary decision outputs that are used in digital sequential finite-state machines that implement Boolean logic expressions to generate ML symbol decisions; and (3) ML symbol decisions are fed back and used to subtract the intersymbol interference value of the current state vector from the vector of the next state to transform the next state vector into an updated current state vector as well as to generate clock phase offset correction signals.

SUMMARY OF THE INVENTION

A method and apparatus are disclosed for parallel maximum-likelihood (ML) processing an analog signal in a run-length-limited (RLL)-coded channel. Values of symbols constituting analog-valued vectors are calculated in parallel from the analog signal by integrating, in parallel, the analog signal weighted by a preselected set of weighting functions orthogonal over a time duration representing a symbol period that is an integral multiple of a bit-clock period. The integrated outputs are held by integrating capacitors at the end of each symbol period. This requires two sets of integrator units, one of which is charging, while the other is discharging.

A minimum Euclidean distance for a finite list of symbol vectors constituting a set of all distinct RLL-coded signals having a duration equal to at least two symbol periods is computed for determining values of a ML signal-to-noise ratio (SNR) for an additive signal-independent noise. A state-dependent ML algorithm iterated during successive symbol periods is used for detecting RLL-coded bit patterns corresponding to successive values of the analog-valued vectors. The algorithm is used for calculating, in parallel, vector scalar products with fixed preselected symbol vectors matched to minimum Euclidean distance RLL-channel signal pairs having durations of the symbol period.

Analog matched filter units compare the values of said vector scalar products to values of preselected thresholds chosen such that a ratio of half of the distance of the threshold values to root mean square values of the additive noise at least equals the ML SNR for generating binary decision outputs. These binary decision outputs are used in conjunction with state values in the form of vectors corresponding to a current state of the channel for determining, sequentially, from the binary decision outputs a RLL-coded symbol constituting a nonambiguous ML decision or an error pointer.

Nominal intersymbol interference is subtracted from the state values of each respective current state for determining values which become updated current state values for the channel. All computations toward ML decisions are performed using Walsh transform coefficients.

BRIEF DESCRIPTION OF THE DRAWING

FIGS. 2A–2C depict two signals and their vector difference value in an EEPR4 channel, assuming no intersymbol interference.

PRELIMINARY DESCRIPTION

FIGS. 1A to 1H illustrate all possible four-bit patterns $m_{1-m8}$ for a four-bit EEPR4 RLL (1,7)-coded signal set and the signals corresponding to these respective patterns, assuming a {1,3,3,1} analog readback pulse. In these figures, $p_1$–$p_8$ and $s_1$–$s_8$ represent the values of the outputs of an analog Walsh transform vector generator, where p is the signal vector that corresponds to the first four bits and s is the signal vector that corresponds to the next four bits. Table 1 is a transition matrix for the RLL (1,7) four-bit patterns depicted in FIG. 1.

signals, assuming no intersymbol interference for a minimum distance event in an EEPR4 RLL (1,7)-coded channel.

Figure 1A:
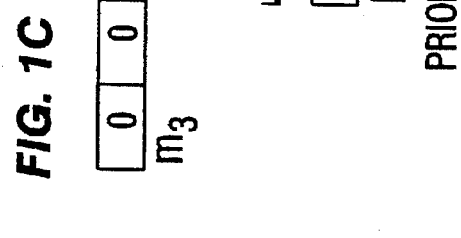
FIGS. 1A–1H depict all possible patterns for a four-bit EEPR4 RLL (1,7)-coded signal set and their corresponding signals, assuming a {1,3,3,1} analog readback pulse.
Figure 1C:
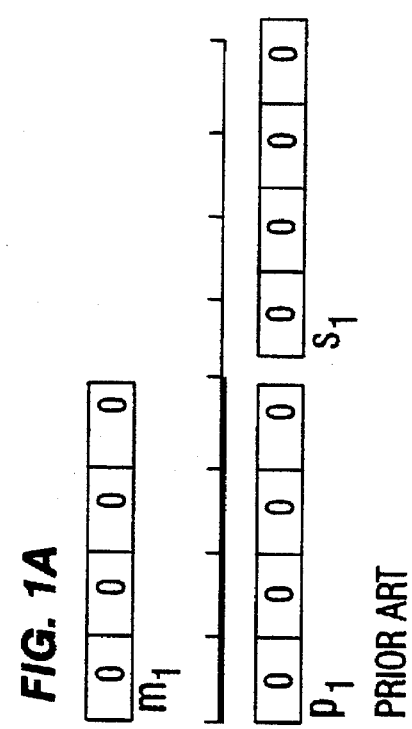
Figure 1B:
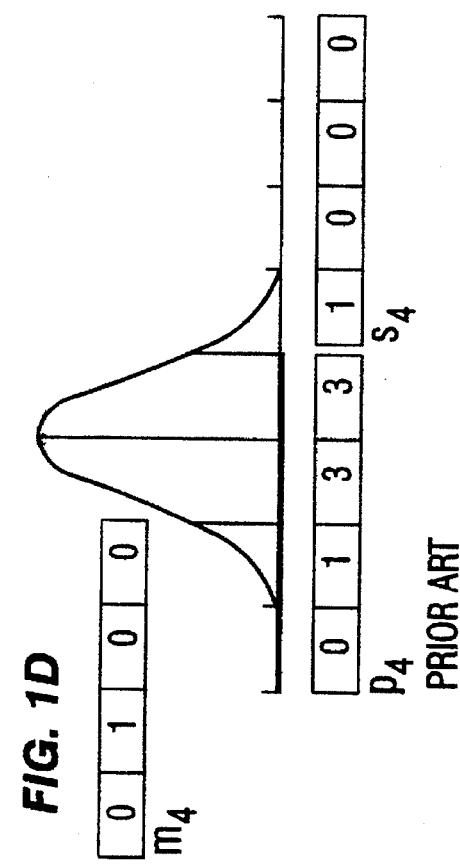
Figure 1D:
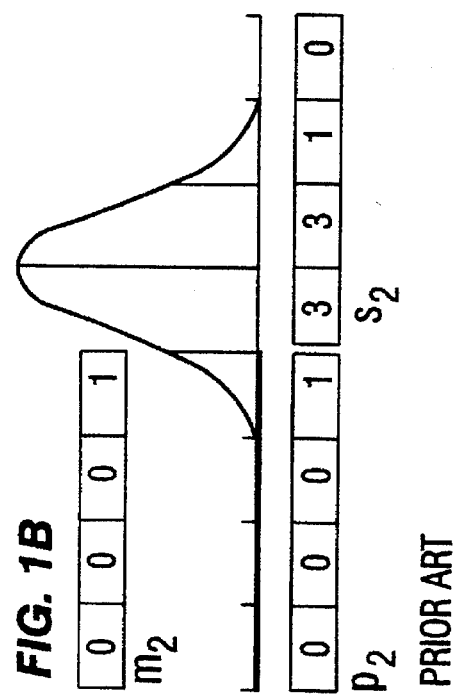
Figure 1E:
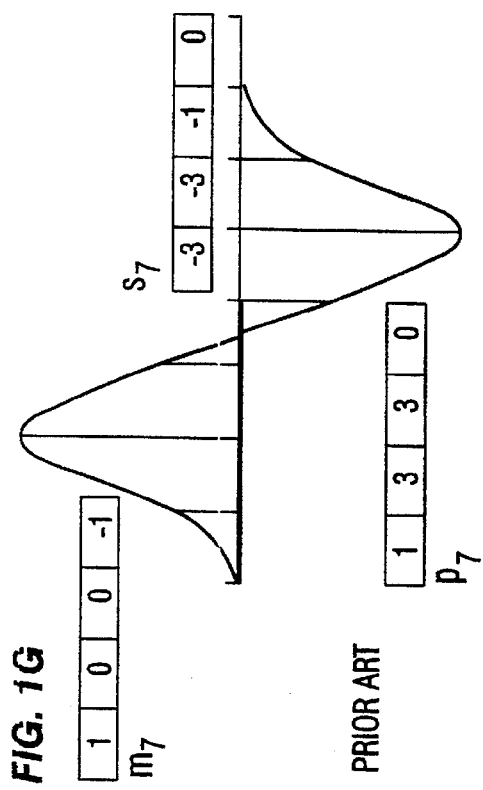
Figure 1G:
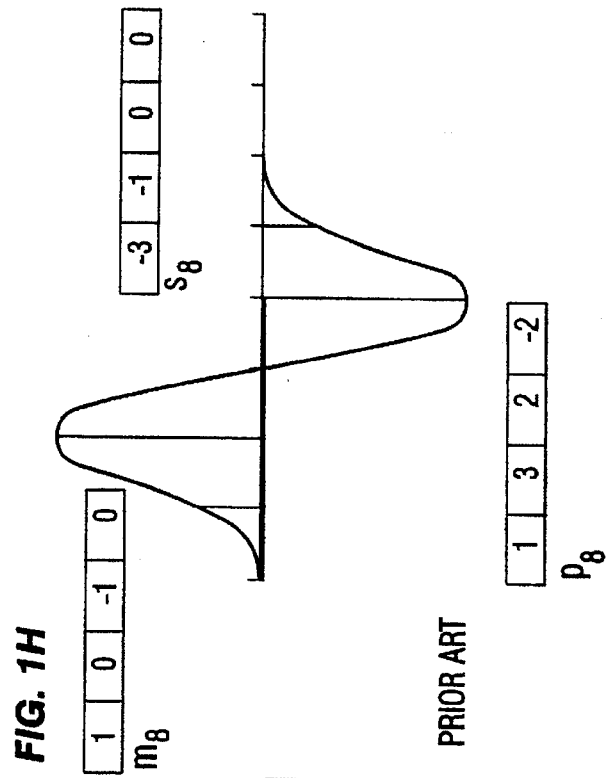
Figure 1F:
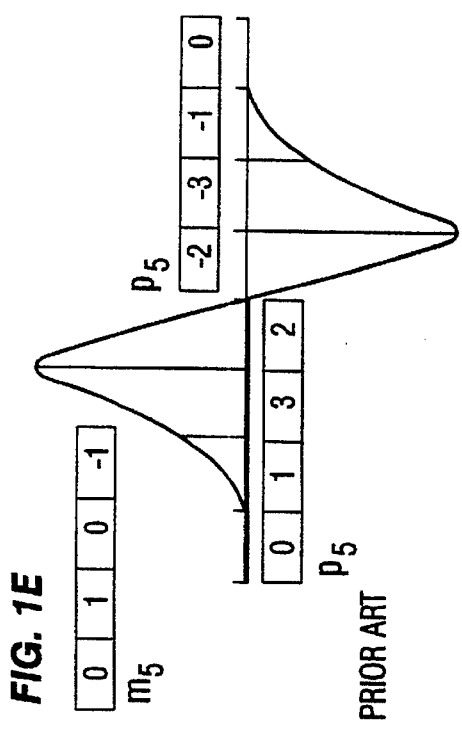
Figure 1H:
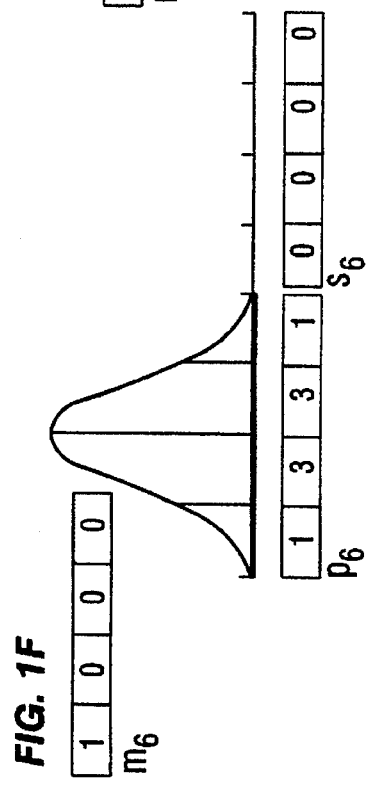
Figure 3:
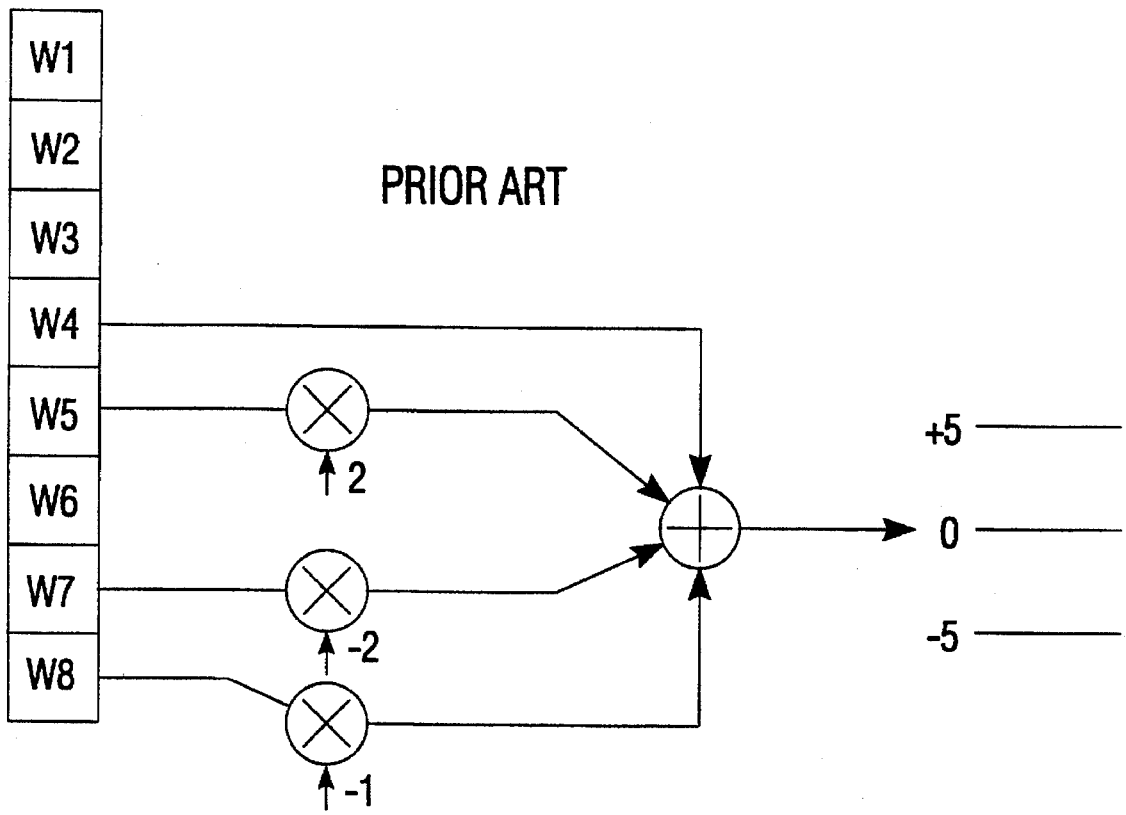
FIG. 3 shows a ML filter matched to a minimum distance event depicted in FIGS. 2A–2C.

FIG. 3 is a schematic diagram of a ML matched filter matched to the minimum distance event depicted in FIGS. 2A–2C, which represents a noiseless pair of signals without intersymbol interference. FIG. 3 depicts a matched filter approach similar to that disclosed in the above-cited U.S. Pat. No. 4,945,538. However, as will become apparent from subsequent descriptions, applicants use matched filters for filtering analog signals, instead of for generating digitized signal sample values.

DESCRIPTION OF THE PREFERRED EMBODIMENT

Figure 4:
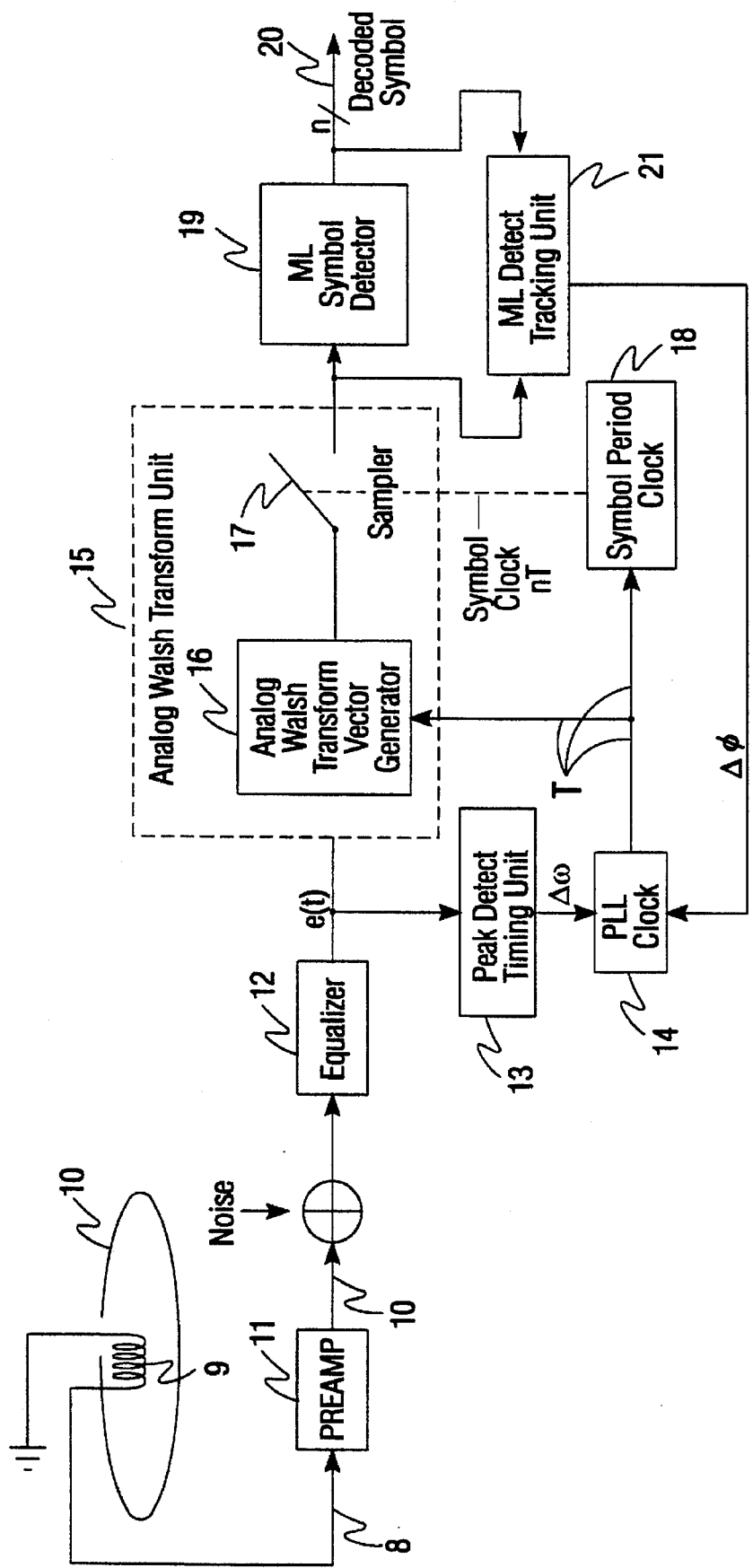
FIG. 4 is a schematic diagram of a RLL-coded signal processing channel embodying the invention.

As illustrated in FIG. 4, the signal processing channel embodying the invention comprises a line 8 via which an analog readback signal, corrupted by noise, is read by a transducer 9, such as a magnetic or optical read head, from a magnetic or optical recording medium 10 in a digital data storage device. This readback signal corresponds to patterns of an n-bit RLL-coded analog data sequence, which as illustrated is a binary data sequence encoded with the (1,7) RLL code during a write operation. The readback signal is amplified by a preamplifier 11 with automatic gain control (AGC) and preferably equalized by an equalizer 12 that provides an EEPR4 {1,3,3,1} pulse shape. The equalized signal e(t) from equalizer 12 is passed to a peak detection timing unit 13 that generates a frequency adjustment signal $\Delta\omega$ for a phase-locked (PLL) clock 14. The apparatus, as thus far described, may be similar to that used in a conventional peak-detection channel with (1,7) code.

According to the invention and as shown in FIG. 4, an analog Walsh transform vector generator-sampler unit 15 comprises a vector generator 16 and sampling switches 17 (only one shown), a clock 18 for providing symbol clock

TABLE 1

RLL (1,7)-coded Four-bit Symbol Transition Matrix (Prior Art)

| $m_i$ | $m_1$ 0 0 0 0 | $m_2$ 0 0 0 1 | $m_3$ 0 0 1 0 | $m_4$ 0 1 0 0 | $m_5$ 0 1 0 1 | $m_6$ 1 0 0 0 | $m_7$ 1 0 0 1 | $m_8$ 1 0 1 0 |
|---|---|---|---|---|---|---|---|---|
| 0 0 0 0 | 0 | 1 | 1 | 1 | 1 | 1 | 1 | 1 |
| 0 0 0 1 | 1 | 1 | 1 | 1 | 1 | 0 | 0 | 0 |
| 0 0 1 0 | 1 | 1 | 1 | 1 | 1 | 1 | 1 | 1 |
| 0 1 0 0 | 1 | 1 | 1 | 1 | 1 | 1 | 1 | 1 |
| 0 1 0 1 | 1 | 1 | 1 | 1 | 1 | 0 | 0 | 0 |
| 1 0 0 0 | 1 | 1 | 1 | 1 | 1 | 0 | 0 | 0 |
| 1 0 0 1 | 1 | 1 | 1 | 1 | 1 | 0 | 0 | 0 |
| 1 0 1 0 | 1 | 1 | 1 | 1 | 1 | 1 | 1 | 1 |

FIGS. 2A and 2B depict two successive signals constituting a minimum distance peak shift event; and FIG. 2C represents a vector difference value between these two pulses every n cycles of the PLL clock 14 to define a symbol clock period; a ML symbol detector 19 for outputting to line 20 a ML n-bit decoded symbol corresponding to the equalized analog signal e(t), and a ML detection tracking unit 21 that is connected in parallel with ML symbol detector 19 and generates a phase-correction signal ΔΦ for transmission to clock 14. It will herein be assumed that n=4.

Figure 5A:
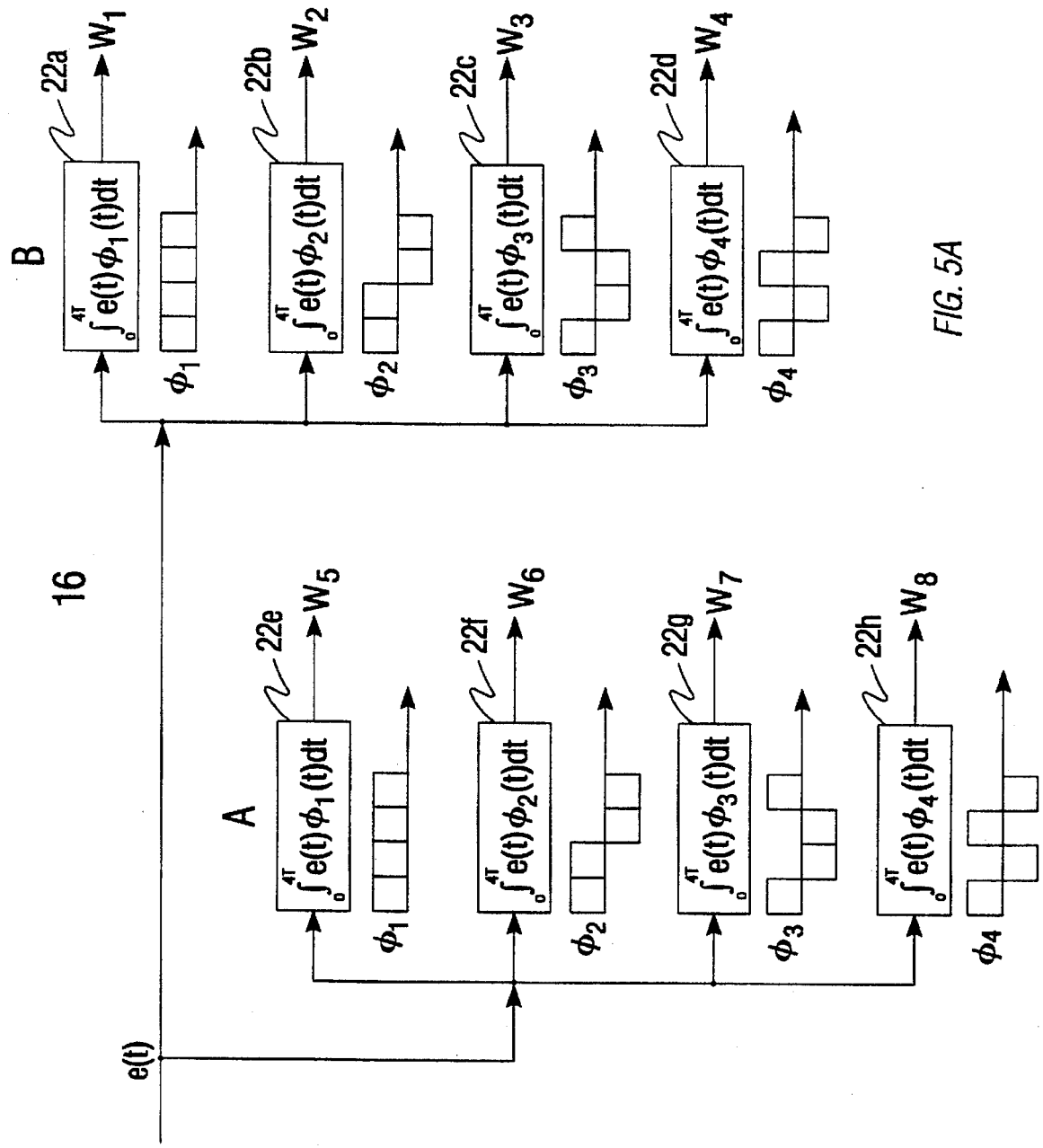
FIGS. 5A and 5B are schematic diagrams which depict in greater detail an analog Walsh transform unit shown in FIG. 4 and one of the eight amplifier/integrator units 22 of the transform unit, respectively.
Figure 5B:
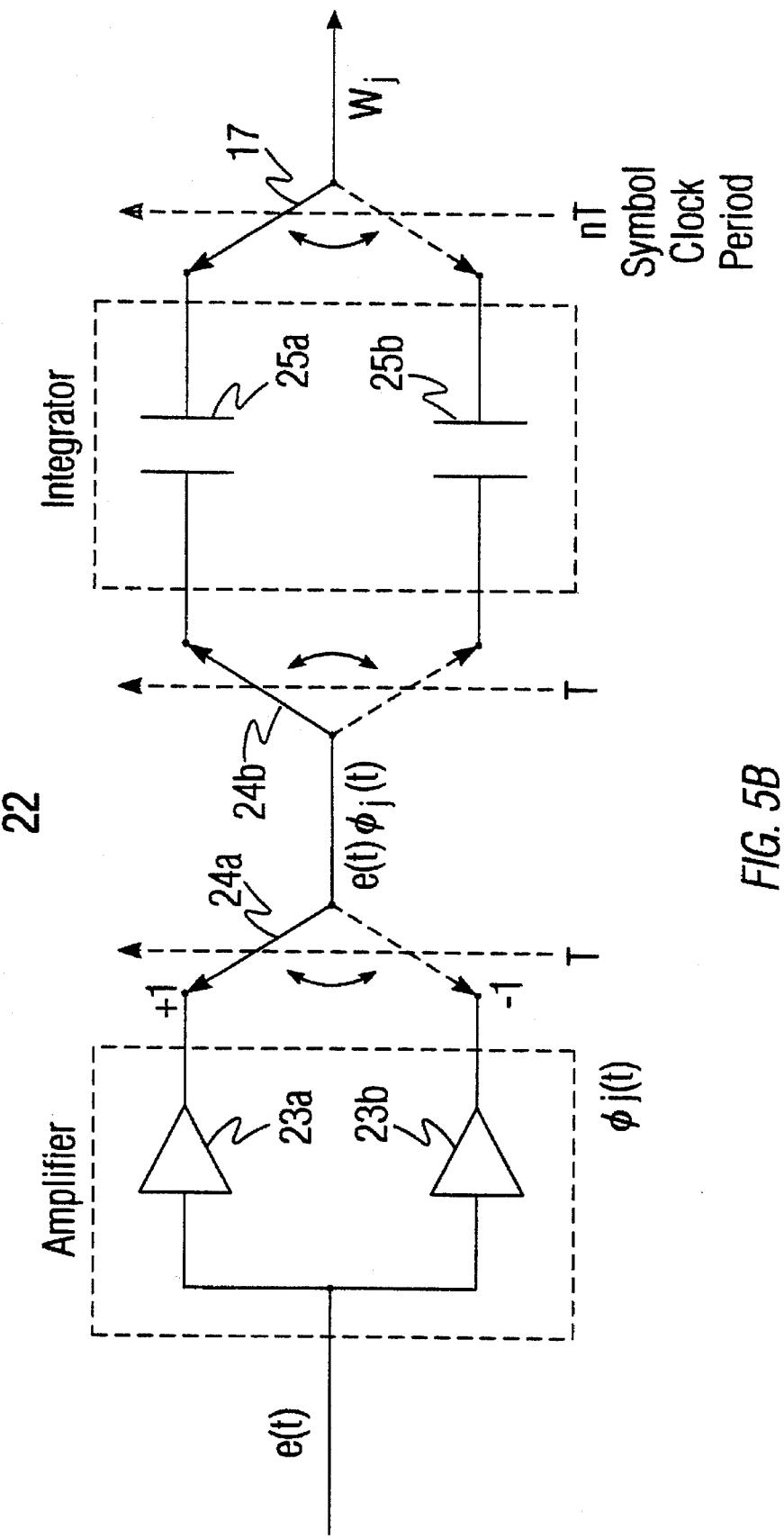

As illustrated in more detail in FIGS. 5A and 5B, equalized analog signal e(t) is integrated in parallel in the analog Walsh transform vector generator-sampler unit 15. As shown in FIG. 5A, vector generator 16 comprises two identical sets A and B, each having four integrator units 22. Each integrator unit 22e–22h in set A weights the signal e(t) by a different preselected Walsh weighting function to provide vectors $[W_5,W_6,W_7,W_8]$ of four Walsh coefficients. Each integrator unit 22a–22d in set B weights the signal e(t) by the same set of different preselected Walsh weighting functions as in set A (e.g., integrator units 22e and 22a weight the same) to provide vectors $[W_1,W_2,W_3,W_4]$ of four Walsh coefficients.

Vectors $[W_5,W_6,W_7,W_8]$ will collectively, for simplification, be referred to as vectors W'. These W' vectors constitute lookahead symbols for a next state of the RLL channel following a then current state. The vectors $[W_1,W_2,W_3,W_4]$, collectively to be referred to as vectors W, constitute symbols for the current state of the channel.

The equalized signal e(t) is continuous and is routed to each set A and B of integrator units 22. As shown in FIG. 5B, each unit 22 comprises a pair of amplifiers 23a, b; three switches 24a, b and 17; and a pair of capacitors 25a, b. Operation of switches 24a and 24b is controlled by the Walsh functions shown in FIG. 5A. Switch 24a a selectively connects amplifiers 23a and 23b with switch 24b. Switch 24b selectively connects to capacitors 25a and 25b. Switch 17, as earlier noted in FIG. 4, is actuated every symbol clock period (assumed herein as of four-bit duration); it selectively establishes connection with capacitor 25a or 25b.

As a result, the capacitors 25e–h of integrator units 22e–h constituting those of set A (FIG. 5A) will be charging during the first of two successive four-bit symbol clock periods and hold the lookahead vectors W' whereas the capacitors 25a–d of the integrator units 22a–d the second of said four-bit symbol clock periods to hold the current state vectors W.

Figure 6:
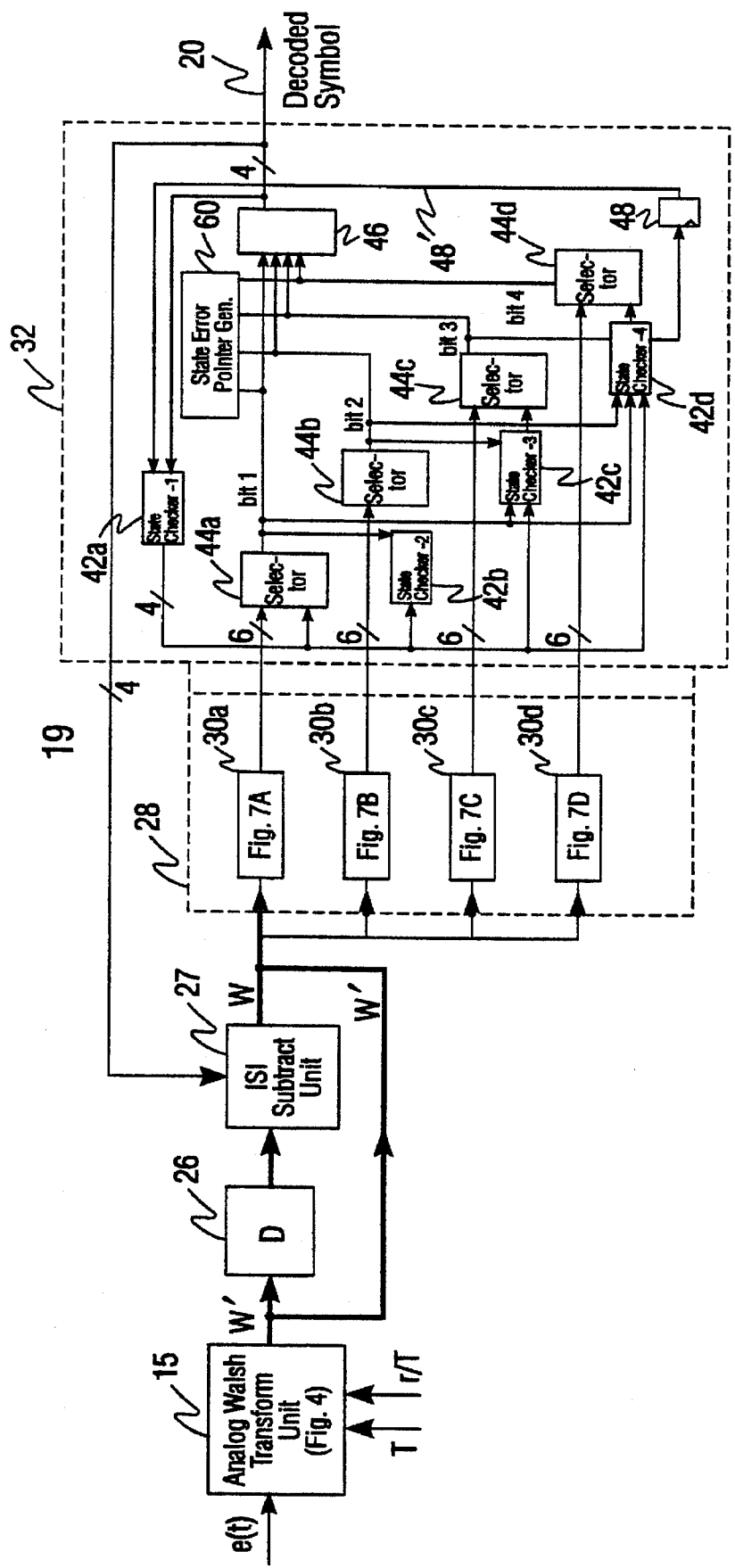
FIG. 6 is a schematic diagram depicting components of an analog vector symbol ML detector comprising parallel analog matched filter units and a digital sequential finite-state machine forming part of the channel shown in FIG. 4.

Referring now to FIG. 6, the W' symbols $[W_5,W_6,W_7,W_8]$ are routed in parallel via a delay unit 26 and an intersymbol interference subtraction unit 27 to a set 28 of analog matched filter units 30a–30d. Delay unit 26 delays the symbols $[W_5,W_6,W_7,W_8]$ for one symbol period of four clock cycles duration. After this delay and the subtraction of intersymbol interference from the ' lookahead symbols $[W_5,W_6,W_7,W_8]$ by unit 27 in the manner presently to be described, the lookahead symbols are transformed into W symbols $[W_1, W_2,W_3, W_4,]$ for an updated current state of the channel.

The vectors W' and W are fed in parallel to the four analog matched filter units 30a–30d. These units 30a–30d calculate values of linear functions chosen to maximize Euclidean distances between vectors whose values are ambiguous in order better to distinguish between them.

The analog matched filter units 30a–d each implement the following three linear functions:

$$F_1 = W_1 - 2W_2 - 2W_4 - W_5$$

$$F_2 = W_1 + 3W_2 + 3W_3 + W_4$$

$$F_3 = W_1 + 3W_2 - 1.2W_4 + 0.6W_5$$

These functions are executed repeatedly four times on the coordinates $[w_1,w_2,w_3,w_4,w_5]$, $[w_2,w_3,w_4,w_5,w_6]$, $[w_3,w_4, w_5,w_6,w_7]$, and $[w_4,w_5,w_6,w_7,w_8]$.

Figure 7A:
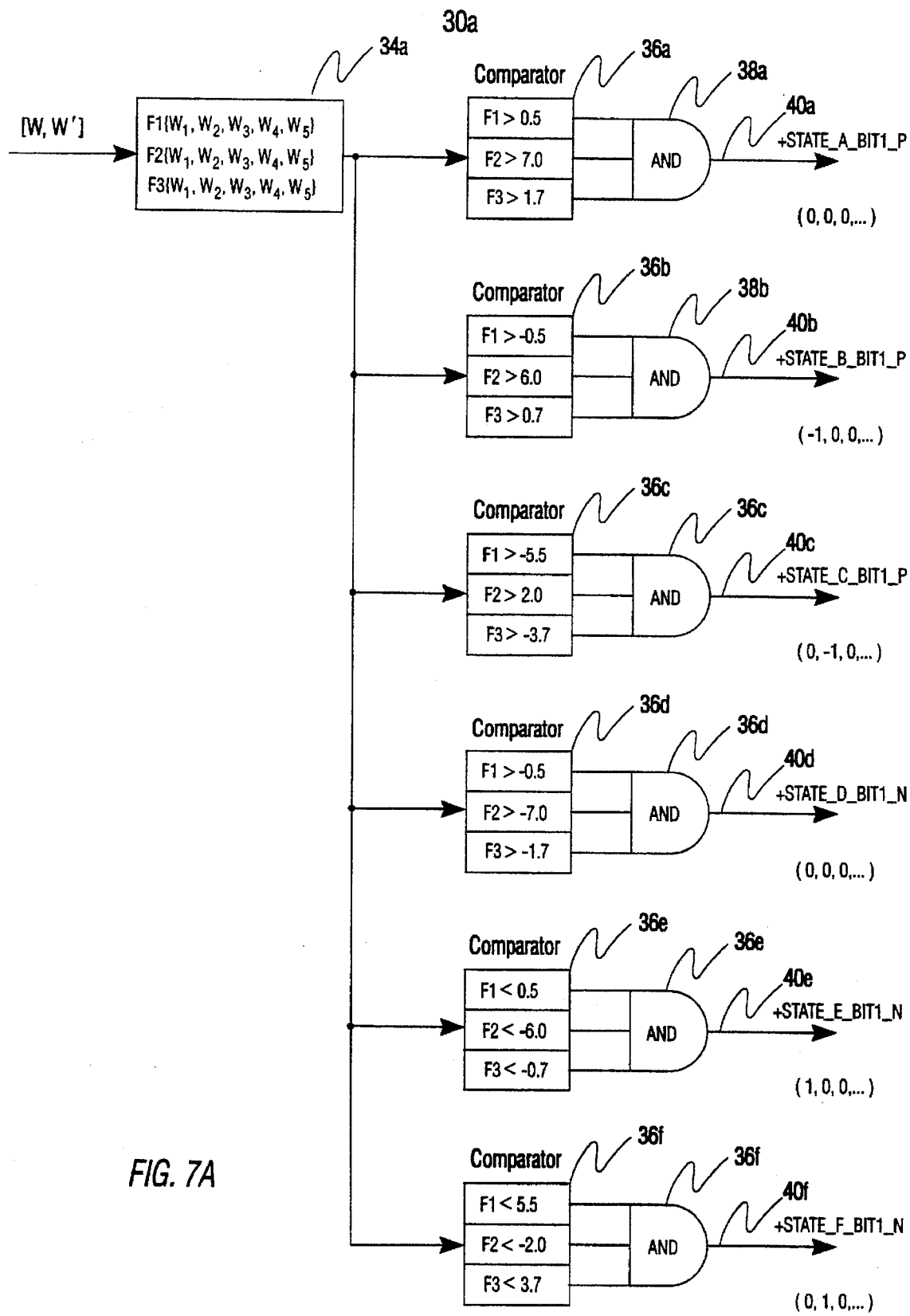
FIGS. 7A–7D depict in greater detail, respectively, each of the four parallel connected analog matched filter units shown schematically in FIG. 6, including the thresholds and binary decision outputs of each filter of each matched filter unit.

FIGS. 7A–7D shows in detail the binary decision outputs generated from the linear functions by the filter units 30a–30d, respectively. More specifically, units 30a–30d comprise filters 34a–34d, respectively, for implementing the linear functions $F_1$, $F_2$, $F_3$. The linear functions $F_1$, $F_2$, $F_3$ output from each filter 34 (e.g., 34a as shown in FIG. 7A) six comparators 36a–36f which compare the respective function values with respective identical preselected threshold values in each of the four units 30a–30d to generate three respective outputs which are ANDed at 38a–38f to provide binary outputs 40a–40f, respectively, to digital sequential finite-state machine 32. More specifically and, for example, the six outputs 40a–40f of matched filter unit 30a for states A–F, respectively, constitute the finite-state machine inputs for bit 1 of the four-bit pattern, and the suffixes P and N denote that the polarity of the next transition beyond the three shown will be positive and negative, respectively.

Note that despite the similarity of threshold values in comparators 36a–36f for each matched filter unit 30a–30d, the ANDed outputs 40a–40f for each analog matched filter unit will differ because of the different values used in the linear functions $F_1$, $F_2$, $F_3$ for the respective matched filter units 30a–30d.

Also, according to a feature of the invention, these compare operations are performed in parallel with a delay of one analog multiplication operation to generate the six binary outputs of each of the four analog matched filter units 30a–30d, which outputs constitute the binary inputs for six distinct states A–F of the digital sequential finite-state machine 32. Finite-state machine 32 checks the sequence of the twenty-four binary decision outputs (the six outputs 40a–40f of each of the four matched filter units 30a–30d) from the twenty-four comparators 36 and decides on the most likely four-bit RLL pattern.

Figure 8A:
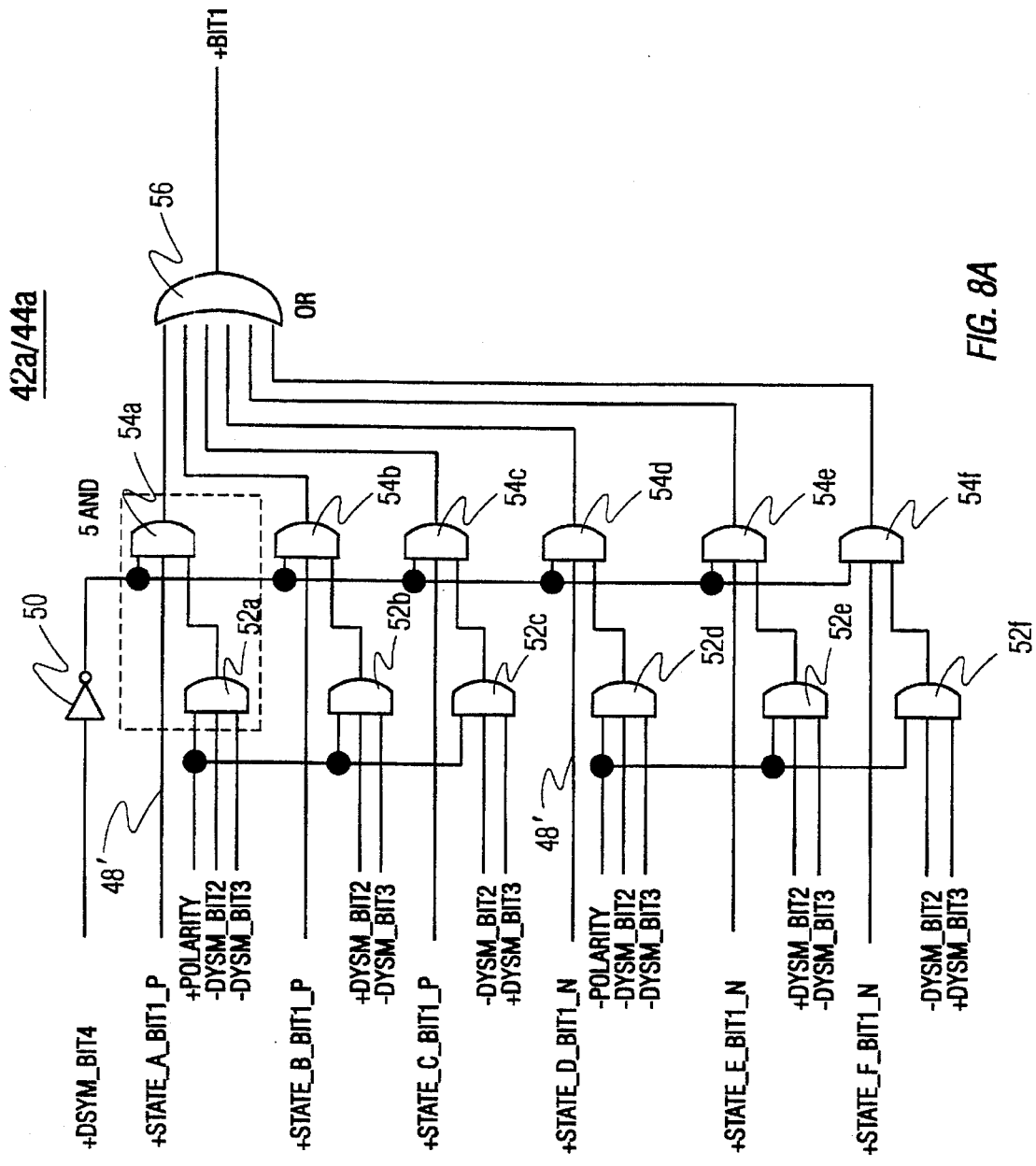
FIGS. 8A–8E depict, in greater detail, the components of the digital sequential finite-state machine shown in FIG. 6.

As shown in FIG. 6, finite-state machine 32 comprises four identical state checker units 42a, b, c, d; and four identical selector units 44a, b, c, d, one set for each decoded bit; a single decoder latch 46; and a single polarity latch 48 whose output 48' indicates the polarity of a detected symbol DSYM. FIGS. 8A–8E show, more specifically, the components of finite-state machine 32. For example, FIG. 8A depicts a combination state checker unit 42a/selector unit 44a for bit I of the four-bit pattern. Unit 42a/44a comprises an inverter 50, six three-way AND gates 52a–f, six three-way AND gates 54a–f, and an OR gate 56. The + and − prefixes before the various inputs indicate positive or negative values for the states, detected symbols DSYM, and polarity.

The previously detected symbol P_DSYM is used to determine the digital channel state, which is defined by its last three bits {P_DSYM(2),P_DSYM(1),P_DSYM(0)} and the polarity of the next expected transition (PNET), as follows:

| P_DSYM(2) | P_DSYM(1) | P_DSYM(0) | PNET | STATE |
|---|---|---|---|---|
| 0 | 0 | 0 | + | A |
| −1 | 0 | 0 | + | B |
| 0 | −1 | 0 | + | C |
| 0 | 0 | 0 | − | D |
| 1 | 0 | 0 | − | E |
| 0 | 1 | 0 | − | F |

The Boolean decision outputs 40 of the comparators 36 in FIGS. 7A–7D are labeled according to these states and expected polarity of the next transition.

Thus, the matched filter unit 30a has as outputs the states for BIT1 which have polarity N or P as shown in FIG. 7A.

Figure 7B:
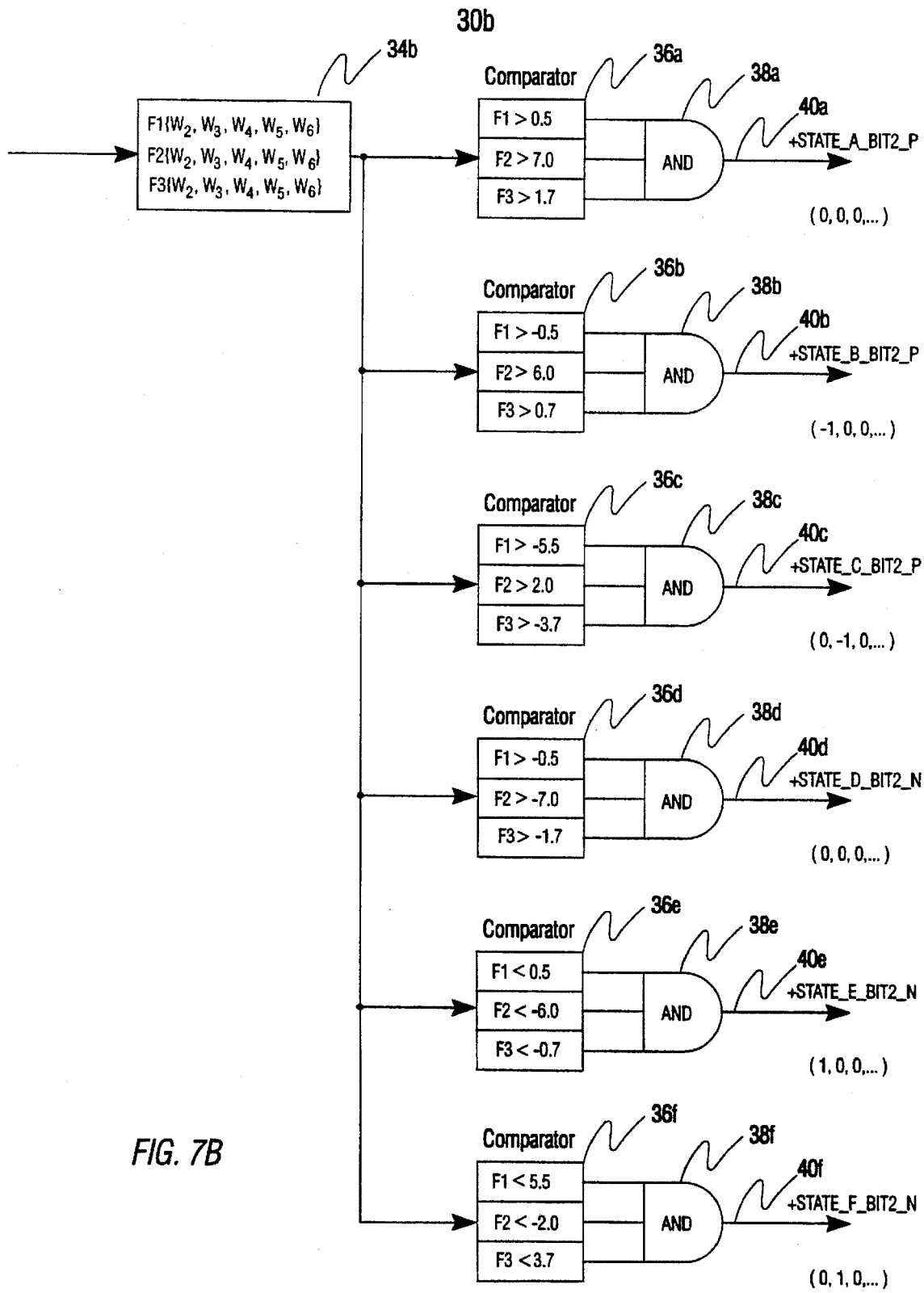
Figure 7C:
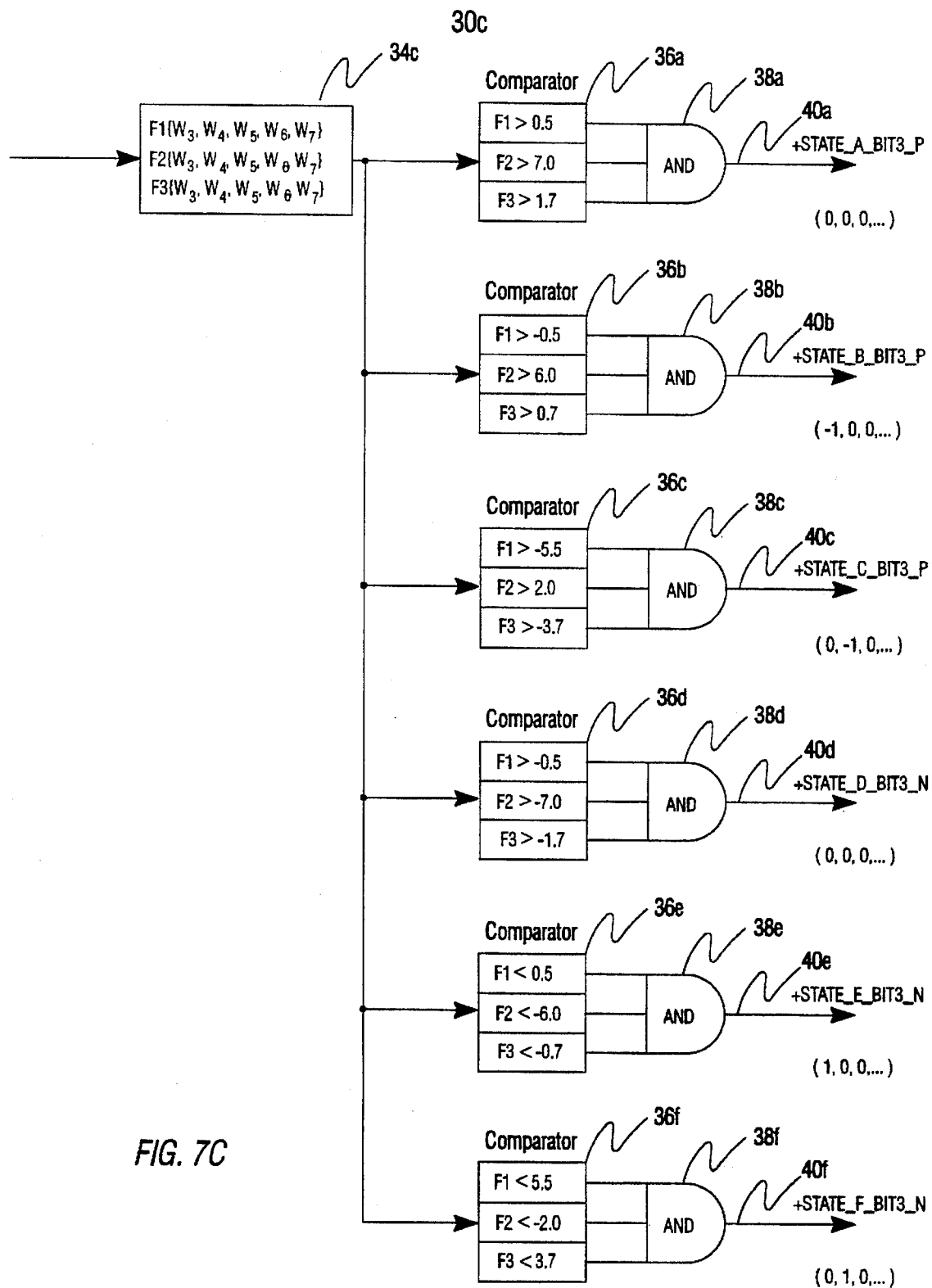
Figure 7D:
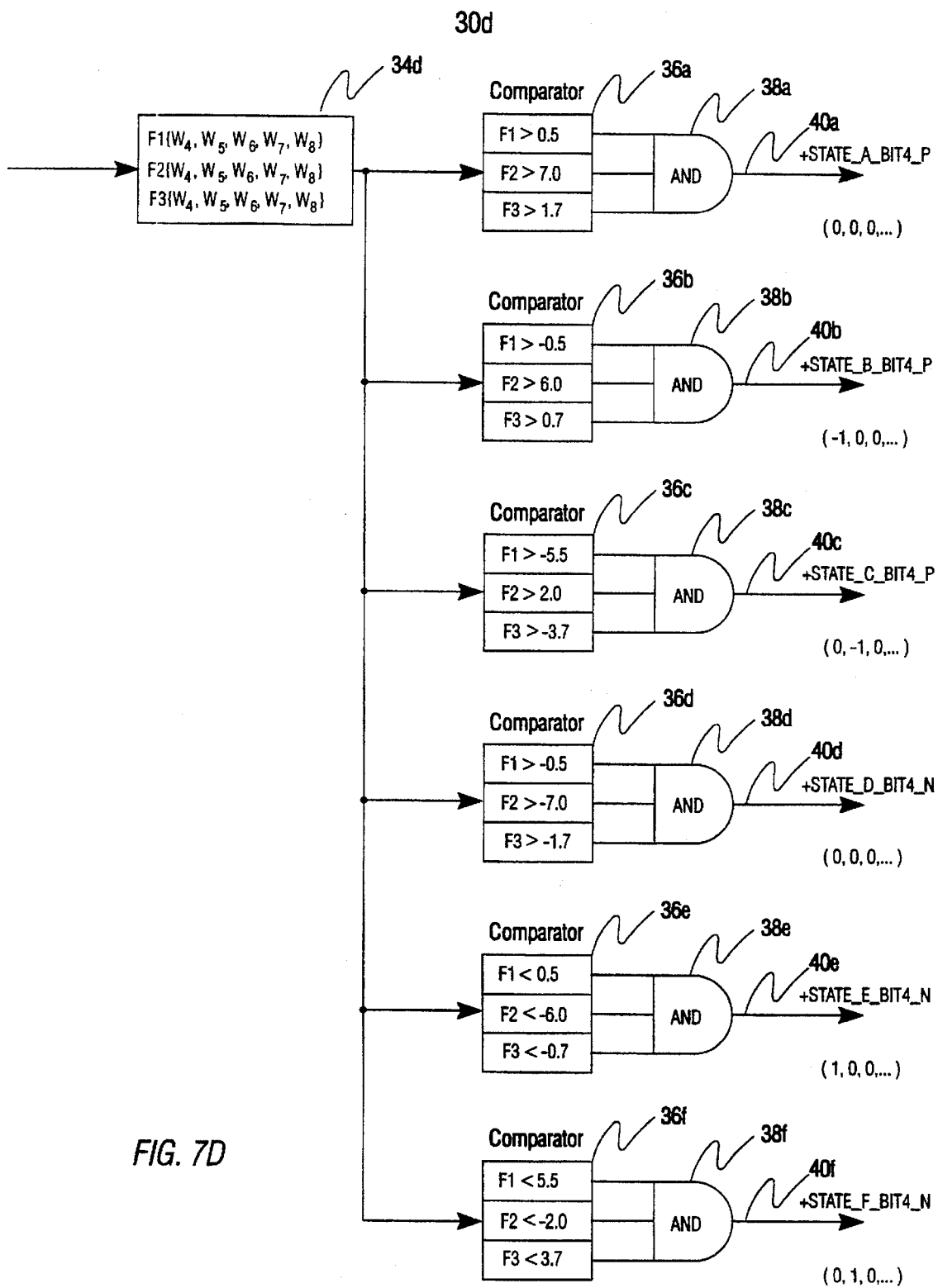

Similarly, FIGS. 7B, 7C, and 7D show all possible state outputs of units 30b, 30c, and 30d for BIT2,3,4, respectively. These states A–F are generated in parallel by the analog matched filter units 30a–d and fed to the sequential digital state machine 32 described in detail in FIGS. 8A–8E. Finite-state machine 32 checks the RLL constraints imposed by the (1,7)-code, and generally is designed to match the constraints of the RLL code used.

As illustrated in FIG. 8A, the last bit in the previously detected symbol, +DSYM_BIT4, is inverted by inverter 50 and ANDed with all the incoming states. Thus, if the last bit in the previously detected symbol was a "1", the "0" output of inverter 50a will be ANDed at 54a–f and provide "0" outputs to OR gate 56. Hence, the output +BIT1 will be "0" to avoid two successive "1" bits which would violate the constraints of the (1,7)-code. However, if the last bit in the previously detected symbol DSYM is a "0", the selector unit 44 will select the state that is consistent with the expected polarity and previously detected bits. Thus, for example, if the previously detected bits –DSYM_BIT2 and –DSYM_BIT3 are "0" and the polarity is +, then AND gate 52a is activated and since BIT4 was "0", the AND gate 54a is activated. Selector unit 44a will thus choose +STATE_A_BIT1_P as being the true state and BIT1 as "0" at the output of OR gate 56.

Figure 8B:
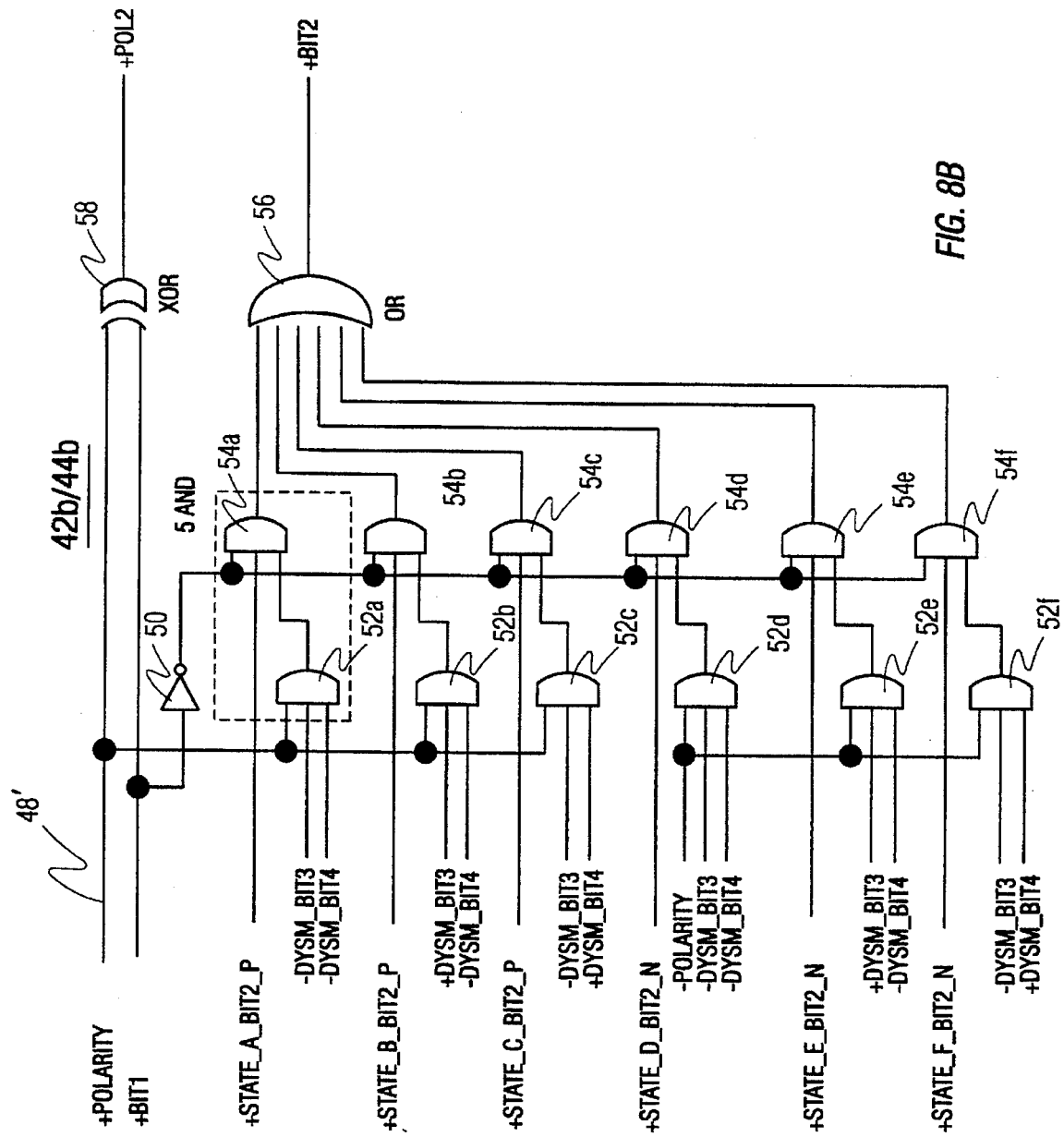
Figure 8C:
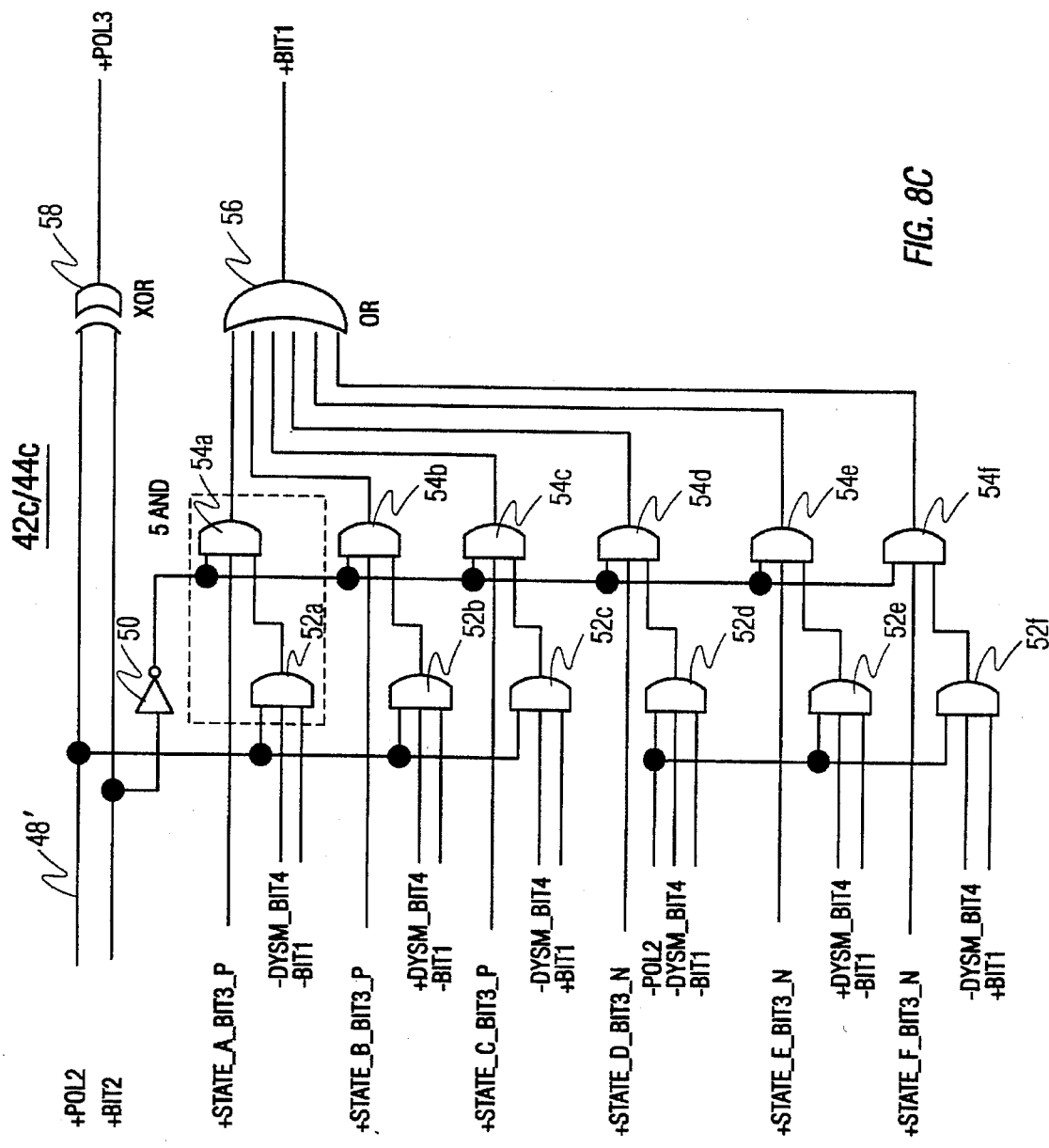

In FIG. 8B, which illustrates state checker unit 42b and selector unit 44b, +BIT1 is the input to the inverter 50. The output of inverter 50 is ANDed at 54a with all the possible states for BIT2 for again prohibiting the occurrence of two successive "1" bits. The operation of this circuit is identical with that of combination unit 42a/44a. Again, only one AND gate 54 is activated; namely, the one that corresponds to the actual previous two bits and the actual channel state for BIT2, as provided by the analog comparator outputs 40. As shown in FIG. 8B, the polarity of BIT1 and BIT1 itself, as detected in FIG. 8A, are XOR'd at 58 to generate the polarity for BIT2. Similarly, the polarities for BIT3 and BIT4 are generated by XORing at 58 the detected BIT2 and BIT3, respectively, and then respective polarities as shown in FIGS. 8C and 8D. After BIT4 is detected and as shown in FIG. 8D, the final polarity for the detected symbol is determined by XORing at 59 the previously generated polarity from XOR 58 and the output from OR gate 56.

Once all four bits have been detected, they are used in conjunction with the previously detected symbol DSYM to cause a state error generator 60 (FIG. 6) to generate a state error pointer if the other (1,7)-code constraint, eight zeroes in a row, is violated.

Figure 8E:
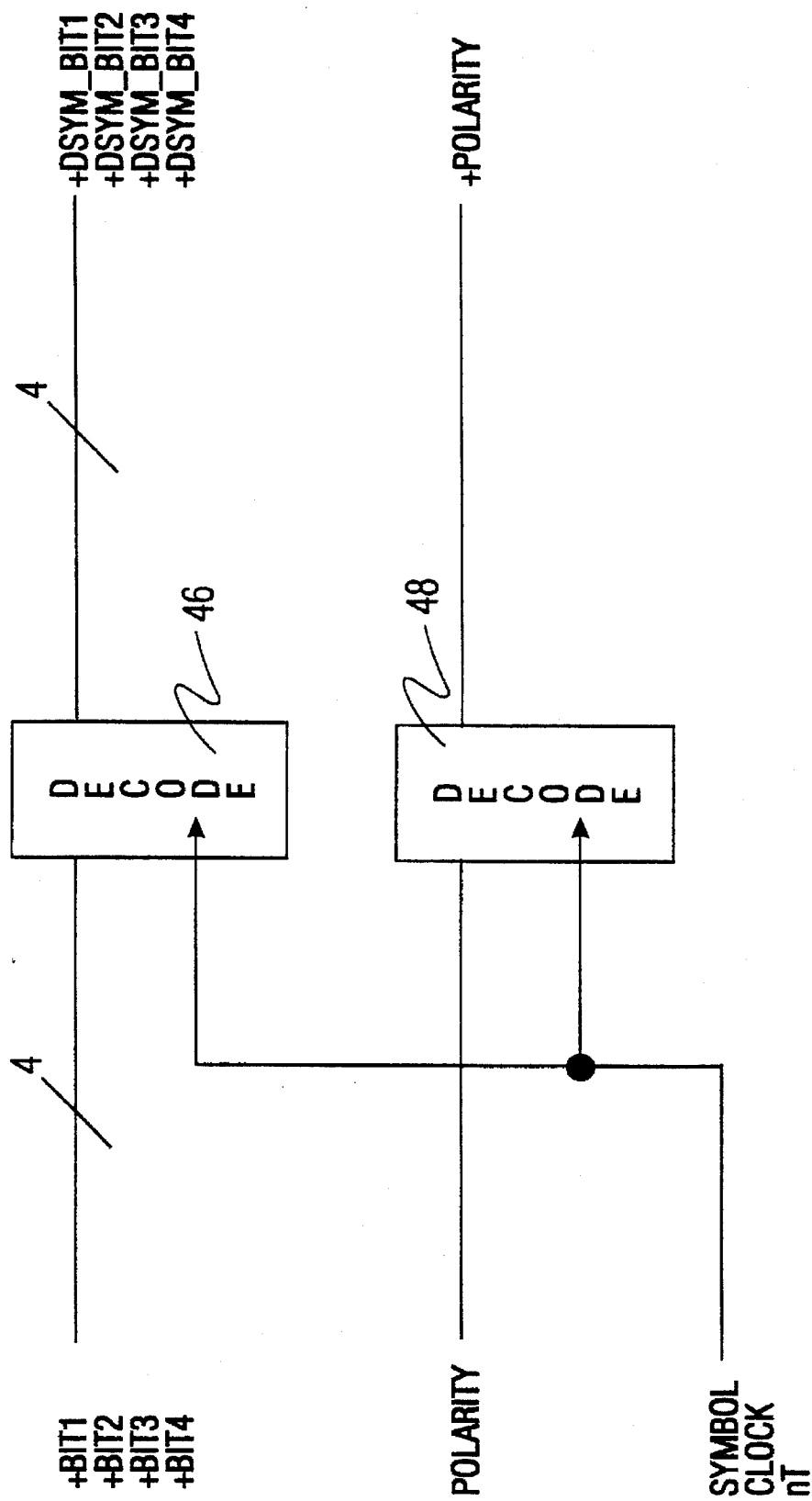
Figure 8D:
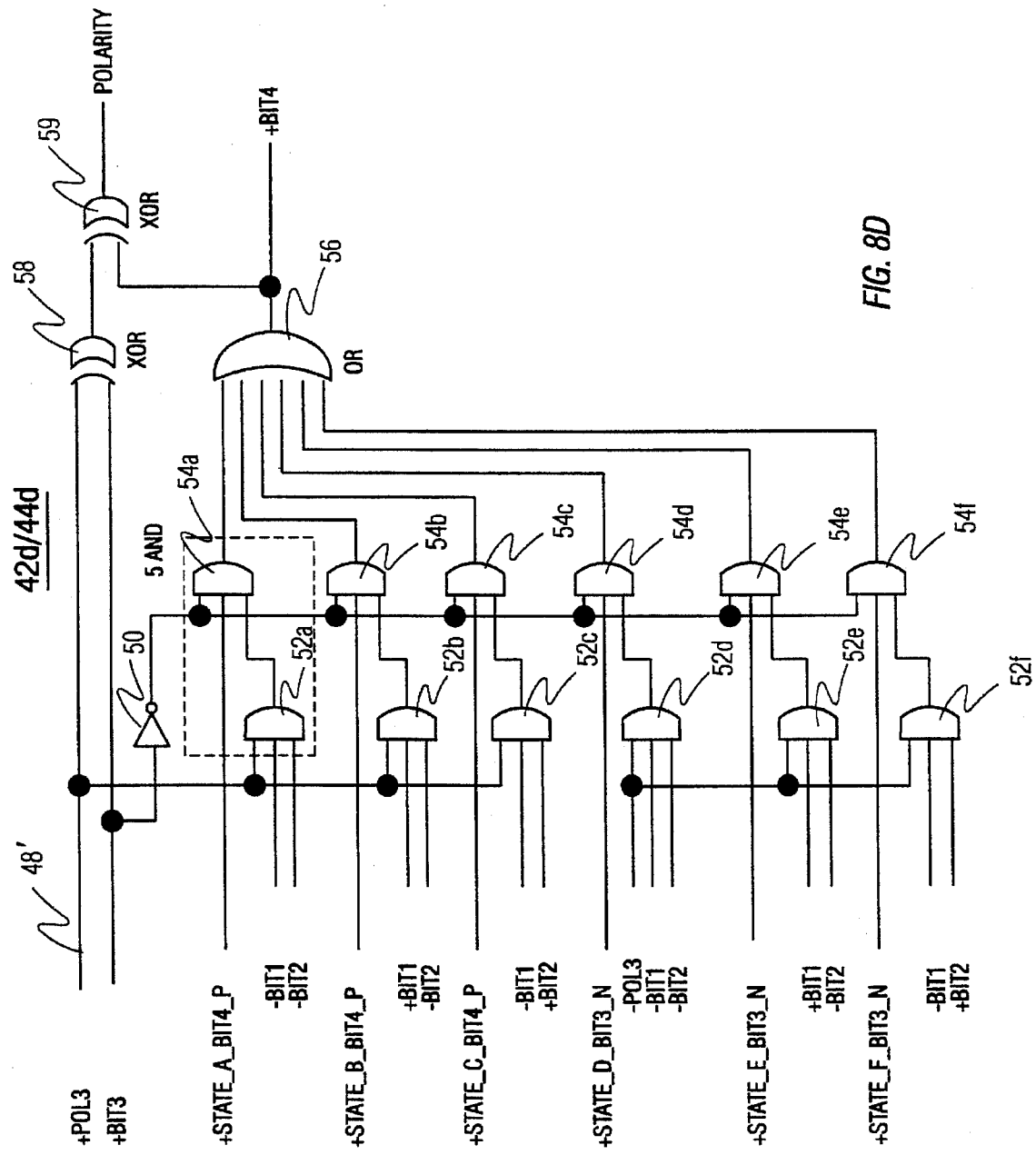

FIG. 8E shows the latch 48 that generates the polarity output and the latch 46 that generates the four-bit detected symbol output.

The ML n-bit decoded symbol output, generically $m_k$, is fed back via a branch of line 20 to intersymbol interference subtraction unit 27. The decoded symbol $m_k$ will be one of the symbols $m_1$–$m_8$ depicted in FIGS. 1A through 1H, respectively. Unit 27 subtracts the appropriate vector $s_{1-s8}$ corresponding to the symbol $m_1$–$m_8$, respectively, from the next state vector W' if the value of the corresponding $P_1$–$P_8$ (FIGS. 1—1 to 1–8) is positive. If, however, the value of the corresponding $P_1$–$P_8$ is negative, then unit 27 will subtract the inverted value of the corresponding $s_1$–$s_8$. The output from the subtraction unit becomes the vector W for the updated current state of the channel.

According to another feature of the invention, phase offset track functions are matched to the decoded symbol output of ML detector 19 by the ML detection tracking unit 21. Referring now to Table 2, m is the symbol variable that can be $\{m_1, \ldots, m_8\}$. H(m) and k(m) are two phase offset track functions that are matched to the possible decoded symbol outputs 20 as shown. For example, if $m=m_1$, then h(m) and k(m) are equal to 0. If $m=m_2$ or $m_2$, then h(m) and k(m) assume the value $|W_1|$, and so on as shown.

TABLE 2

Phase-offset Track Function Matched to ML Detector Symbol Decisions $$h(m) = \begin{cases} 0, & m = m_1 \\ |W_1|, & m = \overline{m_2} \text{ OR } m_2 \\ \dfrac{|W_1 + W_3|}{2}, & m = m_3 \text{ OR } \overline{m_3} \\ \dfrac{|W_1 + W_3|}{2}, & m = m_4, m_5 \text{ OR } \overline{m_4}, \overline{m_5} \\ \dfrac{|W_1 + W_2 + W_3 + W_4|}{2}, & m = m_6, m_7, m_8 \text{ OR } \overline{m_6}, \overline{m_7}, \overline{m_8} \end{cases}$$

$$k(m) = \begin{cases} 0, & m = m_1, m_2 \text{ OR } \overline{m_2} \\ |W_1|, & m = m_3 \text{ OR } \overline{m_3} \\ \dfrac{|W_1 + W_3|}{2}, & m = m_4, m_5 \text{ OR } \overline{m_4}, \overline{m_5} \\ \dfrac{|W_1 - W_2 + W_3 - W_4|}{2}, & m = m_6, m_7, m_8 \text{ OR } \overline{m_6}, \overline{m_7}, \overline{m_8} \end{cases}$$

For a EEPR4 signal, the average values of the phase offset track functions h(m) and k(m) have to be 1 and 3, respectively. If they are not, the phase of PLL clock 14 is shifted for maintaining the proper values of h(m) and k(m). Separate adjustment of PLL clock frequency by the peak detection timing unit 13 and of PLL clock phase by the ML detection phase tracking unit 21 enhances stability of the PLL clock 14 and minimizes jitter.

The invention has been illustrated with a finite-state machine designed for an EEPR4 RLL (1,7)-coded signal processing channel. However, it is to be understood that the analog matched filter units 30 and comparators 36 may be used for the detection of any four-bit RLL-coded data. Only the digital sequential finite-state machine described in FIGS. 8A–8E need be modified as appropriate by those skilled in the art for use with other RLL-coded channels. It will also be apparent that other modifications may be made in the invention as illustrated without departing from the spirit and scope of the invention. Hence, the invention should not be deemed limited except as proscribed in the following claims.

What is claimed is:

1. A method for parallel maximum-likelihood (ML) processing an analog signal in a run-length-limited (RLL)-coded channel, comprising the steps of:

calculating, in parallel from the analog signal, values of symbols constituting analog-valued vectors by integrating, in parallel, the analog signal weighted by a preselected set of weighting functions orthogonal over a time duration representing a symbol period that is an integral multiple of a bit-clock period;

holding the integrated outputs at the end of each symbol period to provide, in parallel, values of the analog-valued vectors;

computing a minimum Euclidean distance for a finite list of symbol vectors constituting a set of all distinct RLL-coded signals having a duration equal to at least two symbol periods for determining values of a ML signal-to-noise ratio (SNR) for an additive signal-independent noise;

using a state-dependent ML algorithm iterated during successive symbol periods, calculating, in parallel, vector scalar products with fixed preselected symbol vectors matched to minimum Euclidean distance RLL-channel signal pairs having durations of said symbol period for detecting RLL-coded bit patterns corresponding to successive values of the analog-valued vectors;

using matched filter units, comparing values of said vector scalar products to values of preselected thresholds chosen such that a ratio of half of the distance of the threshold values to root mean square values of said additive noise at least equals the ML SNR for generating binary decision outputs;

using said binary decision outputs in conjunction with state values in the form of vectors corresponding to a current state of the channel, sequentially determining from the binary decision outputs either a RLL-coded symbol constituting a nonambiguous ML decision or an error pointer; and subtracting nominal intersymbol interference from the vector for each respective current state from a vector for a respective next state of the channel for transforming the vector for the next state into an updated current state vector.

2. The method of claim 1, wherein all computations toward ML decisions are performed using Walsh transform coefficients.

3. The method of claim 1, including the step of equalizing the analog signal to an EEPR4 pulse shape corresponding to the polynomial $(1-D)(1+D)^3$.

4. The method of claim 1, wherein during the computing step, the distinct RLL-coded signals have a duration equal to two symbol periods to provide a one-symbol lookahead to enable a ML decision.

5. The method of claim 1, including during the second calculating step, executing the state-dependent algorithm using (i) combinations of preselected vector components of a current symbol vector preselected to optimize the SNR values used for ML decision and (ii) combinations of components of said current symbol vectors and of at least one symbol ahead of said current symbol.

6. The method of claim 1, wherein the weighting functions are chosen such that the resulting symbol vectors have a minimum Euclidean distance equal to that of the analog signal.

7. The method of claim 1, wherein the weighting functions comprise binary-valued weights.

8. In a method of ML processing an analog signal in a RLL-coded channel, the step of:

calculating, in parallel from the analog signal, symbols constituting analog-valued vectors by integrating, in parallel, the analog signal weighted by a preselected set of weighting functions orthogonal over a time duration representing a symbol period that is an integral multiple of a bit-clock period.

9. In the method of claim 8, the additional steps of:

calculating, in parallel, vector scalar products with fixed preselected symbol vectors matched to minimum Euclidean distance RLL-channel signal pairs having durations of said symbol period; and using analog matched filter units, comparing in parallel values of said vector scalar products to values of preselected thresholds chosen such that a ratio of the threshold values to values of additive signal-independent noise at least equals a ML SNR for generating binary decision outputs which are used for determining either a RLL symbol constituting a nonambiguous ML decision or an error pointer.

10. A method of parallel processing, in a RLL-coded channel, symbols that constitute analog vector values calculated from a RLL-coded analog signal and have a duration that is an integral multiple of a bit-clock period, comprising the steps of:

computing a minimum Euclidean distance for a finite list of symbol vectors constituting a set of all distinct RLL-coded signals having a duration equal to at least two symbol periods for determining values of a ML signal-to-noise ratio (SNR) for an additive signal-independent noise whose root mean square value in each ML decision is the Euclidean length of a fixed vector used in a vector scalar product; and computing, in parallel, values for each of a plurality of thresholds such that the SNR is at least the computed minimum SNR of the set of RLL-coded signals.

11. The method of claim 10, including the step of:

using the computed threshold values, making binary-valued ML decisions and logically combining said decisions until a nonambiguous ML decision is made or an erasure pointer is generated.

12. The method of claim 11, including the step of:

feeding back the nonambiguous ML decision to a subtraction unit for subtracting intersymbol interference from a vector for a current state of the channel from a Walsh coefficients vector for a next state of the channel for transforming the vector for the next state into an updated current state vector.

13. A method for parallel ML processing an analog signal in a RLL-coded channel, comprising the steps of:

precomputing, in analog matched filter units, values of vectors constituting differences between successive minimum distance signal pairs;

computing vectors for a current state and a next state of the channel using the Walsh transform coefficients vector of the analog signal;

using the current and next state vectors and the precomputed vector values, generating vector scalar product values;

determining by parallel processing whether said vector scalar products are above or below a range of preselected threshold values for generating binary decision outputs; and using said binary decision outputs in Boolean logical expressions to generate ML symbol decisions.

14. The method of claim 13, including the stop of feeding back and using ML symbol decisions to subtract an intersymbol interference vector for the current state from the Walsh transform coefficients vector for the next state to transform said next state vector into an updated current state vector.

15. An apparatus for parallel ML processing, in a RLL-coded signal processing channel, analog values of symbols corresponding to an analog signal representative of coded binary data, comprising:

clock means for providing, for each of a preselected number N of symbols prescribed by the RLL code, an output every n bit periods, where each of said N symbols has a duration of n bit periods;

n integrators, each for integrating a respective one of said n Walsh functions to produce vectors of n Walsh coefficients; and matched filter units for calculating values of linear functions chosen to maximize Euclidean distances between vectors corresponding to a current state and a next state whose values are ambiguous in order better to distinguish between them;

a comparator forming part of each matched filter unit for comparing a value of a respective one of the linear functions with a preselected threshold value to generate a respective one of a plurality of binary decision outputs; and a finite state machine for generating from said binary decision outputs either a RLL-coded symbol constituting a nonambiguous ML decision or an error pointer.

16. The apparatus of claim 15, including a subtraction unit which, from said binary decision outputs, subtracts an intersymbol interference vector for a current state of the channel from a vector for a next state of the channel to transform the vector for said next state into an updated current state vector.

17. A data storage system comprising:

a recording medium for storing RLL-coded binary data;

a transducer for providing an analog signal corresponding to binary data read from said recording medium; and an apparatus of the type defined in claim 15 for parallel ML processing of analog values of symbols corresponding to said analog signal.

18. An apparatus for parallel ML processing an analog signal in a RLL-coded channel comprising:

means including analog matched filters for precomputing values of vectors constituting differences between successive minimum distance signal pairs;

an analog Walsh transform vector generator for computing vectors for a current state and a next state of the channel using Walsh transform vector coefficients of the analog signal;

means for generating vector scalar product values from the current and next state vectors and the precomputed vector values;

comparators for determining whether said vector scalar products are above or below a range of preselected threshold values for generating binary decision outputs; and a digital sequential finite state machine for generating from said binary decision outputs either a RLL-coded signal constituting a nonambiguous ML decision or an error pointer.

19. A data storage system comprising:

a recording medium for storing RLL-coded binary data;

a transducer for providing an analog signal corresponding to binary data read from said recording medium; and an apparatus of the type defined in claim 18 for parallel ML processing of analog values of symbols corresponding to said analog signal.

20. In an apparatus for parallel ML processing, in a RLL-coded signal processing channel, the combination of:

a phase-locked (PLL) clock;

a peak detection timing unit for providing a signal $\Delta\omega$ for adjusting the frequency of the PLL clock;

a ML symbol detector for generating a binary ML decoded symbol output from vectors of Walsh coefficients derived from weighted integrated analog signals; and a ML detection phase tracking unit which matches linear functions of the values of said weighted integrated analog signals to the ML decoded symbol output to provide a signal $\Delta\omega$ for adjusting the phase of the PLL clock.

* * * * *